(12) United States Patent
Sohmura et al.

(10) Patent No.: US 7,329,053 B2
(45) Date of Patent: Feb. 12, 2008

(54) OPTICAL TRANSMISSION DEVICE AND ELECTRONIC APPARATUS

(75) Inventors: Atsushi Sohmura, Osaka (JP); Hiroshi Mizuno, Nara (JP); Mitsuhisa Ikuta, Nara (JP); Kazuhiro Mitsumoto, Tokyo (JP); Shigeru Umeki, Tokyo (JP)

(73) Assignees: Sharp Kabushiki Kaisha, Osaka (JP); Yufu Gosei Kagaku Co., Ltd., Tokyo (JP)

( * ) Notice: Subject to any disclaimer, the term of this patent is extended or adjusted under 35 U.S.C. 154(b) by 210 days.

(21) Appl. No.: 11/172,796

(22) Filed: Jul. 5, 2005

(65) Prior Publication Data

US 2006/0013102 A1     Jan. 19, 2006

(30) Foreign Application Priority Data

Jul. 6, 2004   (JP) .............................. 2004-199649

(51) Int. Cl.
    *G02B 6/36* (2006.01)

(52) U.S. Cl. ............................ 385/88; 385/89; 385/90; 385/91; 385/92; 385/93; 385/94

(58) Field of Classification Search .............. 385/88–94
    See application file for complete search history.

(56) References Cited

U.S. PATENT DOCUMENTS

| | | | |
|---|---|---|---|
| 6,208,817 B1 * | 3/2001 | Chadani et al. | 399/104 |
| 6,471,412 B1 | 10/2002 | Belenkiy et al. | |
| 2002/0191921 A1 * | 12/2002 | Satoh | 385/92 |
| 2004/0223701 A1 * | 11/2004 | Tanaka et al. | 385/55 |

FOREIGN PATENT DOCUMENTS

| | | |
|---|---|---|
| JP | 2001-235659 | 8/2001 |
| JP | 2002-048952 | 2/2002 |
| JP | 2003-322766 A | 11/2003 |
| KR | 2001-0078268 A | 8/2001 |
| KR | 2001-0085558 A | 9/2001 |

* cited by examiner

*Primary Examiner*—Frank G. Font
*Assistant Examiner*—Jerry Martin Blevins
(74) *Attorney, Agent, or Firm*—Birch, Stewart, Kolasch & Birch, LLP

(57) ABSTRACT

An optical transmission device configured from a case that holds an optical element that receives and/or transmits light, the case being provided with a plug insertion hole into which a plug for transmitting an optical signal is inserted; and a shutter mechanism having a shutter that opens and closes the plug insertion hole; wherein the case is provided with an installation part that holds the shutter such that it can rotate freely, and wherein the shutter mechanism can be installed from the outside to the installation part.

18 Claims, 12 Drawing Sheets

OPTICAL TRANSMISSION DEVICE AND ELECTRONIC APPARATUS

BACKGROUND OF THE INVENTION

1. Field of the Invention

This application claims priority on Patent Application No. 2004-199649 filed in Japan on Jul. 6, 2004, the entire contents of which are hereby incorporated by reference.

The present invention relates to optical transmission devices used in electronic equipment such as DVD players, DVD recorders, televisions, and set-top boxes, as well as audio-video receivers, personal computers, PDAs, mobile phones and the like; and further relates to electronic apparatuses.

2. Description of the Related Art

In recent years, in household equipment of which DVD is representative, digital audio signal transmission by optical signals is becoming widespread. The receiving and transmitting portions of such digital audio signal transmission are provided with a mechanism that, when signal transmission is not performed, prevent the invasion of dust and other foreign substances into the part where the light receiving and transmitting portion is optically/mechanically joined with the plug portion of the fiber-optic cable, and that protect the eyes from light leakage.

As this sort of mechanism, in the conventional technology, shutter mechanisms were used such as a type in which a protective cap is fitted on the insertion portion, and a type in which a cover opens and closes in response to plug insertion and removal. In recent years, many products have been provided with these shutter mechanisms for the sake of convenience and preventing the accidental invasion described above.

Optical transmission devices provided with this type of shutter mechanism include a case that holds an optical element that receives and/or transmits light, the case being provided with a plug insertion hole into which a plug for transmitting an optical signal is inserted; a shutter that opens and closes this plug insertion hole; and a torsion coil spring that biases the shutter in the direction that closes the shutter (for example, see JP 2003-322766A).

In this optical transmission device, when a plug is not inserted, the shutter is biased by the torsion coil spring from the inside of the case towards the outside, and becomes closed. When inserting a plug, the shutter is pushed inside along with this plug insertion. When the plug is fully inserted, the shutter and the torsion coil spring are contained inside the case without harming the optical system of the optical element and the fiber-optic plug (hereinafter, referred to as "plug"). When the plug is removed, there is movement opposite to that when the plug is inserted. That is, the force that lets the torsion coil spring return to its original shape pushes the shutter in the direction outside the case body, and it returns to its original state.

In these conventional optical transmission devices, the case is divided into halves so that it has a front portion housing and a rear portion housing, and when installing the shutter mechanism, the front portion housing must be joined with the rear portion housing after this shutter mechanism is installed inside the front portion housing. Therefore, the assembly structure of the optical transmission device is complicated, and the conventional technology has not arrived at a point where the number of parts can be adequately reduced.

SUMMARY OF THE INVENTION

The present invention was made in view of the problems described above, and its object is to provide an optical transmission device that can be cheaply produced with a simple design, wherein the number of parts can be reduced. It is a further object of the invention to provide an optical transmission device that can more effectively succeed at preventing the invasion of dust and other foreign substances into the part that optically/mechanically joins the light receiving and transmitting portion with the plug portion of the fiber-optic cable, and at protecting eyes from light leakage, which were objects of the conventional technology.

In order to solve the problems stated above, the optical transmission device of the present invention comprises a case that holds an optical element that receives and/or transmits light, the case being provided with a plug insertion hole into which a plug for transmitting an optical signal is inserted; and a shutter mechanism having a shutter that opens and closes the plug insertion hole; wherein the case is provided with an installation part that holds the shutter such that it rotates freely, and wherein the shutter mechanism can be installed from the outside.

With this configuration, there is no need for a configuration dividing the case in order to install the shutter mechanism, and along with being able to easily and quickly perform installation work, design of the case structure is simple, and it can be inexpensively produced with the least number of parts.

Also, in the optical transmission device of the present invention, it is preferable that the shutter mechanism is provided with an elastic body that biases the shutter in a direction that closes the shutter, the shutter being provided with a holding means that holds this elastic body and with a rotating shaft, and a bearing into which the rotating shaft is fitted being formed in the installation part.

Further, it is preferable that the elastic body comprises a torsion coil spring, and that the holding means is configured of a support portion for holding this torsion coil spring and a protrusion for preventing detachment of the torsion coil spring. With this configuration, due to the protrusion on the rear surface of the shutter, it is not likely for the spring installed to the support portion of the shutter to become detached, and assemblability improves.

In addition to the above configuration, it is preferable that a part of the torsion coil spring other than the end of a movable arm slides along an inside surface of the case when the shutter opens or closes. With this structure, due to the cross-sectional face of the spring not touching the portion of the housing that slides against the spring, smooth sliding can be obtained. By making the spring arm of the sliding portion a rounded shape, it is possible to obtain even smoother sliding.

Also, it is preferable that a guiding depression for fixing the position of the arm of the torsion coil spring is provided on the inside surface of the case on which the arm of the torsion coil spring slides. Due to the movable arm of the coil fitting into a guiding depression of the housing, it is possible to prevent vertical displacement of the sliding portion of the spring when the shutter opens and closes.

Also, a fixing depression may be provided on the rear face of the shutter that fixes the position of the shutter in the vertical direction by engagement of the arm of the torsion coil spring. With this configuration, it is possible to fix the heightwise position of the shutter by the guiding depression of the housing, the fixing depression of the shutter, and both arms of the torsion coil spring, and it is possible to prevent parts other than the housing and the rotating shaft from coming into contact when opening and closing the shutter.

Also, the case may be provided with a positioning means for preventing shutter pop-out. With this configuration, by letting the shutter abut against this positioning means when the shutter is closed, it is possible to prevent the shutter from popping out frontward from the holder.

It is preferable that the bearing portion of the case is provided with a detachment prevention means for preventing detachment of the rotating shaft of the shutter.

Further, it is preferable that, when the shutter is opened and a plug inserted, the shutter presses the plug against the inside surface of the case due to the elastic force of the elastic body. With this configuration, it is possible to provide a highly reliable optical transmission device wherein play between the plug and the optical transmission device is suppressed to within a tolerance range.

The shutter mechanism may be configured of a torsion coil spring. With this configuration, it is possible to provide an inexpensive optical transmission device with a further reduced number of parts.

The rotating shaft of the shutter may be made of a torsion coil spring portion, and the shutter may be configured of a resin plate and metal wire formed in one piece with this torsion coil spring. With this configuration, it is possible to provide a more highly reliable optical transmission device that does not have a spring arm disposed in the shutter opening and closing portion inside the case.

Protrusions for preventing positional displacement of the torsion coil spring may be provided around the torsion coil spring. Further, it is preferable that on the rear side of the shutter; holding protrusions that fit around the coil portion of the torsion coil spring are formed by molding them in one piece on the rear side of the shutter. With this configuration, the task of passing the coil portion of the torsion coil spring through the support portion becomes unnecessary, and it is possible to provide an optical transmission device with a structure that is easy to assemble.

In the optical transmission device of the present invention, the configuration of the shutter mechanism may also be such that it is provided with a torsion coil spring that biases the shutter in the direction that closes the shutter, and the end of the arm of this torsion coil spring is held by the shutter.

The elastic body may also be configured such that it comprises a plate spring. In this configuration, it is preferable that the shutter and the plate spring are molded in one piece. With this configuration, it is possible to provide an optical transmission device that is easy to assemble and has high production efficiency.

An electronic apparatus in accordance with the present invention is provided with the optical transmission device of the present invention, and has the same effect as the aforementioned optical transmission device, that is, it is possible to design a configuration with the least number of parts and handling is simple, realizing an inexpensive and highly reliable electronic apparatus.

DETAILED DESCRIPTION OF THE INVENTION

Hereinafter, embodiments of the present invention will be described with reference to the accompanying drawings.

FIRST EMBODIMENT

Figure 1:
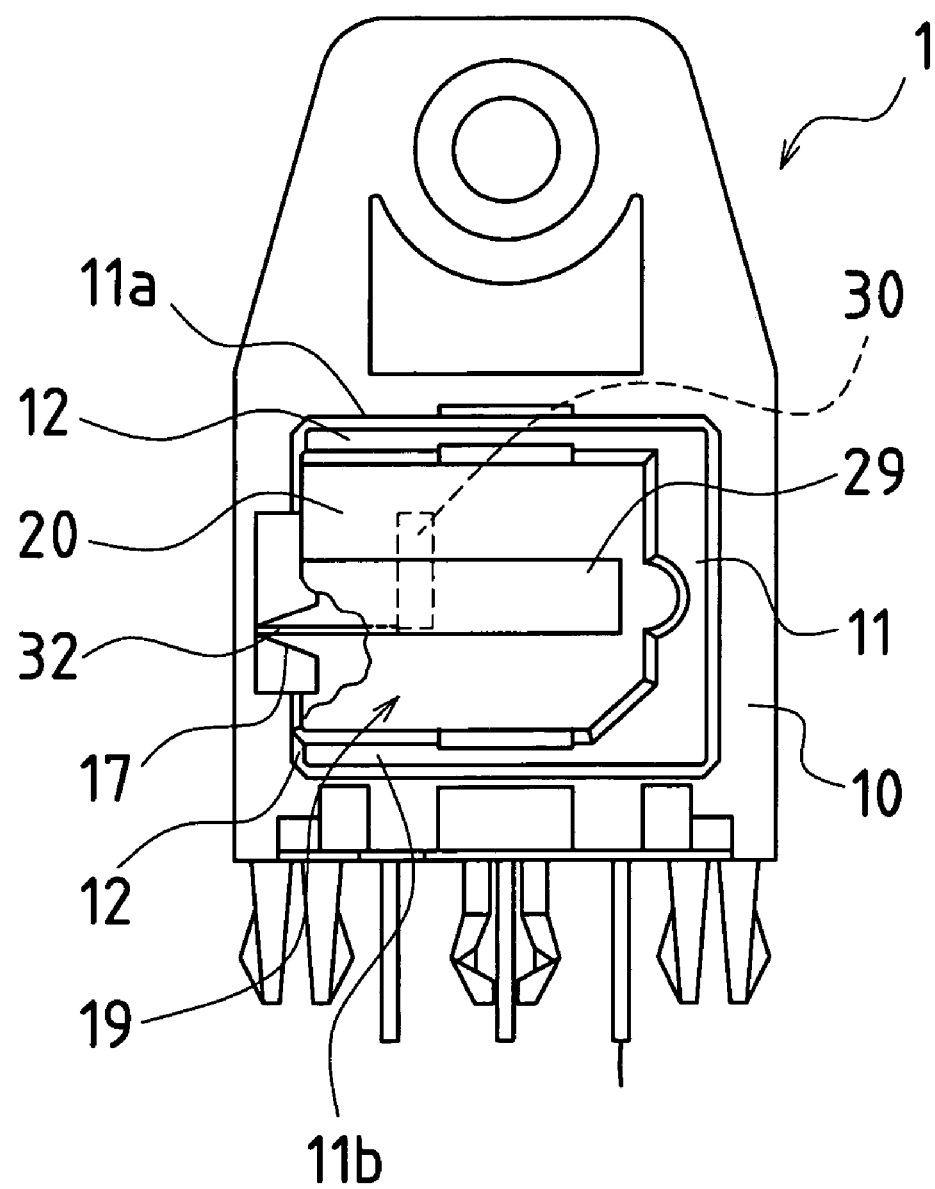
FIG. 1 is a front view of the optical transmission device of a first embodiment of the present invention.
Figure 2:
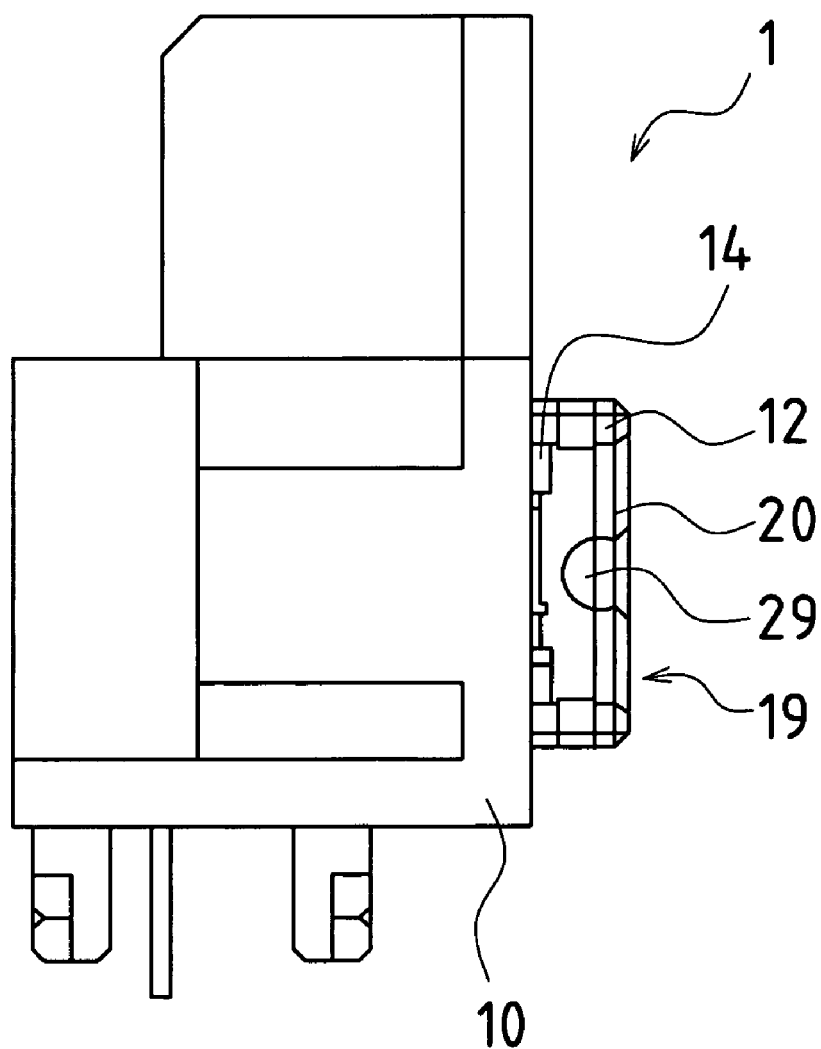
FIG. 2 is a side view of the optical transmission device of the first embodiment of the present invention.
Figure 3A:
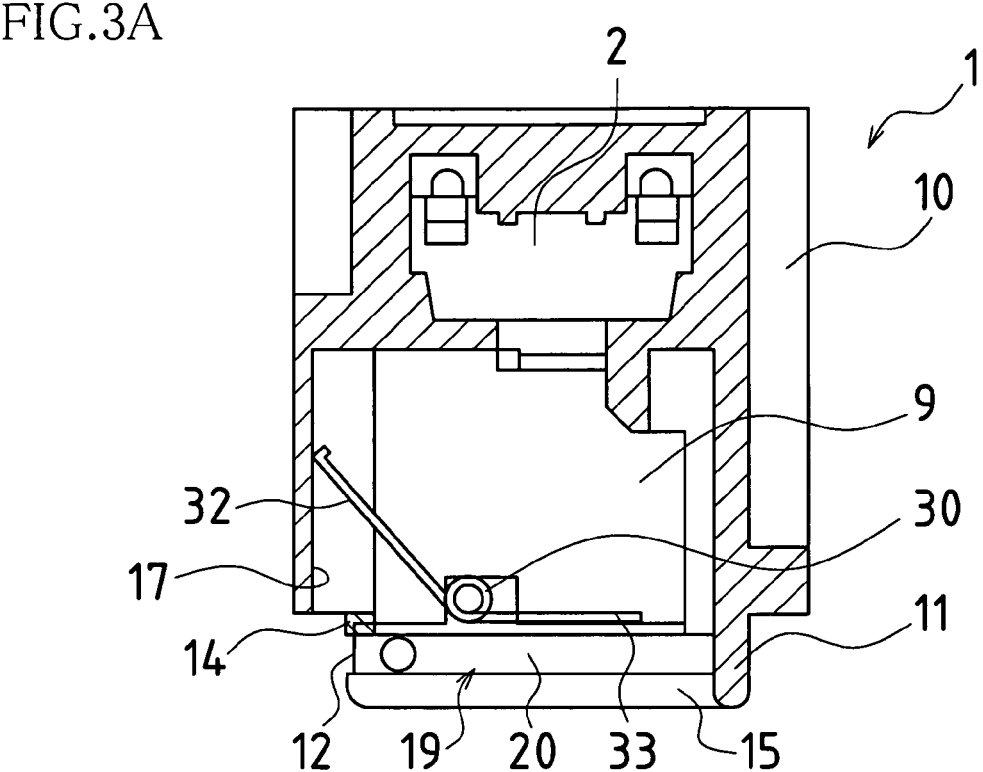
FIG. 3A is a cross-sectional plan view showing the shutter of the optical transmission device of the first embodiment of the present invention in a closed state.
Figure 3B:
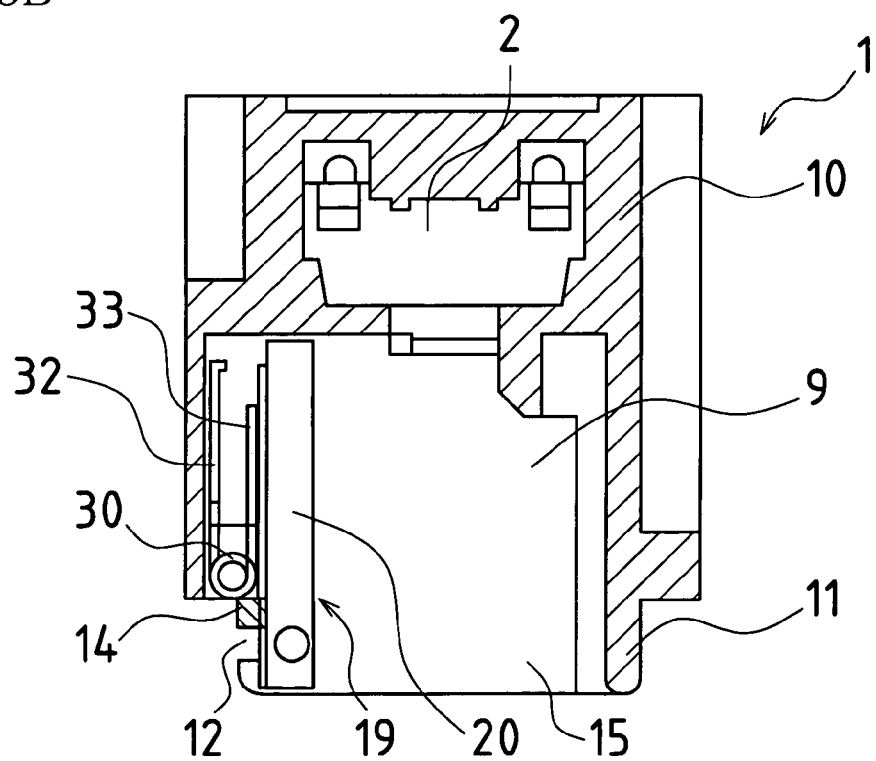
FIG. 3B is a cross-sectional plan view showing the same shutter in an open state.

FIG. 1 is a front view of the optical transmission device of a first embodiment of the present invention, and FIG. 2 is a lateral view of the same. FIG. 3A is a cross-sectional plan view with the shutter in a closed state, and FIG. 3B is a cross-sectional plan view with the shutter in an open state.

As shown in FIGS. 1 through 3, an optical transmission device 1 of the present embodiment mainly comprises a single case 10 (hereinafter, referred to as "housing") and a shutter mechanism 19. The case 10, which holds an optical element 2 that receives or transmits light, is provided with an insertion hole 15 into which a plug is inserted. The shutter mechanism 19 opens and closes this insertion hole 15. The shutter mechanism 19 comprises a shutter 20, and a torsion coil spring 30 as an elastic body that biases the shutter 20 in the direction closing the same.

The housing 10 is molded in one piece and is provided with a containing portion 9 that contains the optical element 2 and the fiber-optic cable plug, and an installation part 11 that holds the shutter 20 such that it can rotate. Hereinafter, the item in which all of the parts mentioned above other than the optical element have been assembled will be referred to as a holder.

Figure 4A:
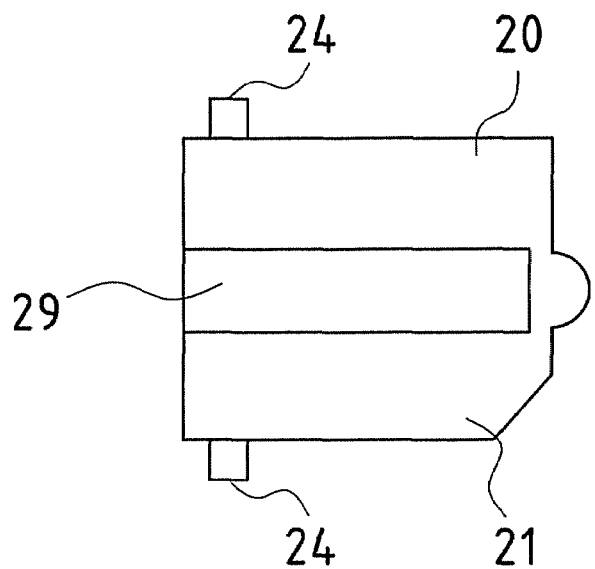
FIG. 4A is a front view showing the shutter mechanism used in the optical transmission device of the first embodiment.
Figure 4B:
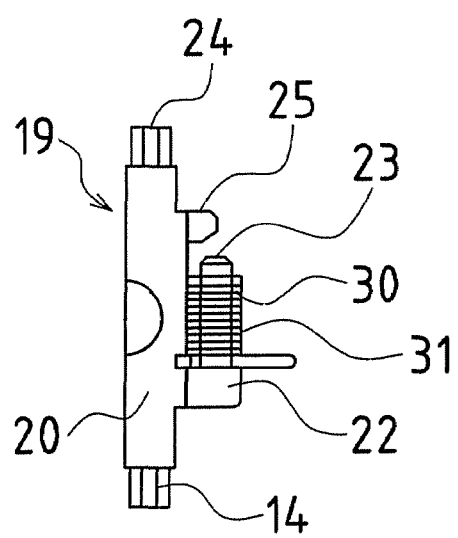
FIG. 4B is a side view thereof.
Figure 4C:
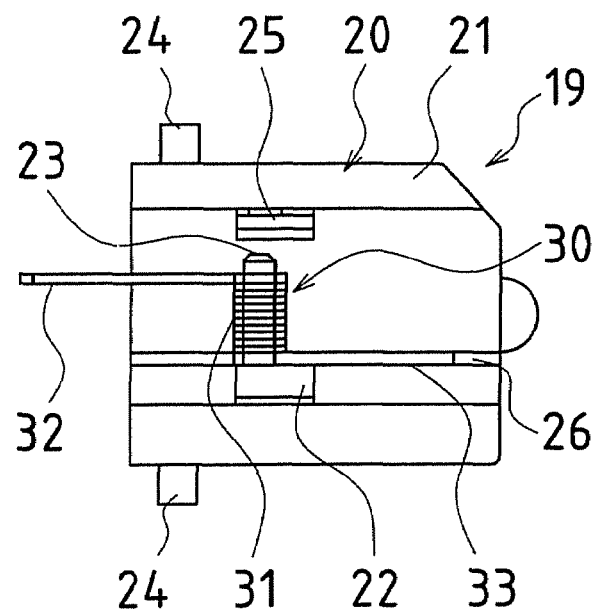
FIG. 4C is a rear view thereof.

As shown in FIGS. 4A through C, the shutter 20 includes a main shutter body 21; a base 22 provided on the rear side of the main shutter body 21; a support shaft 23 protruding upward from the base 22; a protrusion 25 for preventing spring detachment, provided on the rear side of the main shutter body 21 such that there is a predetermined clearance above the support shaft 23; and rotating shafts 24 respectively protruding from the upper and lower surfaces of the main shutter body 21. The main shutter body 21, the base 22, the support shaft 23, the protrusion 25 for preventing spring detachment, and the rotating shafts 24 are molded in one piece from synthetic resin. A support portion is formed by the base 22 and the support shaft 23, and a holding means is formed by the support portion and the protrusion 25 for preventing spring detachment. On the rear side of the shutter 20, a depression 29 is formed that serves as a guide groove for the plug when the plug is inserted, and on the reverse side, a groove-shaped fixing depression 26 is formed that is engaged by a torsion coil spring 30.

The torsion coil spring 30 comprises a coil portion 31 that is fitted around the support shaft 23 of the shutter 20 from above; a movable arm 32 that slides along the inside face of the housing 10; and a holding arm 33 that engages the fixing depression 26 of the main shutter body 21. Because the holding arm 33 is fixed through its engagement with the fixing depression 26 of the shutter 20, the torsion coil spring 30 does not move in the vertical direction relative to the shutter 20. The movable arm 32 is longer than the holding arm 33, but the length of the two arms can be the same, or the holding arm 33 can be longer than the movable arm 32.

The protrusion 25 for preventing spring detachment of the shutter 20 prevents the torsion coil spring 30 mounted to the shutter 20 from detaching from the support shaft 23, even if the holding arm 33 of the torsion coil spring 30 is inadvertently detached from the fixing depression 26. This protrusion 25 for preventing spring detachment may be disposed at any location where it can prevent detachment of the torsion coil spring 30.

Figure 5A:
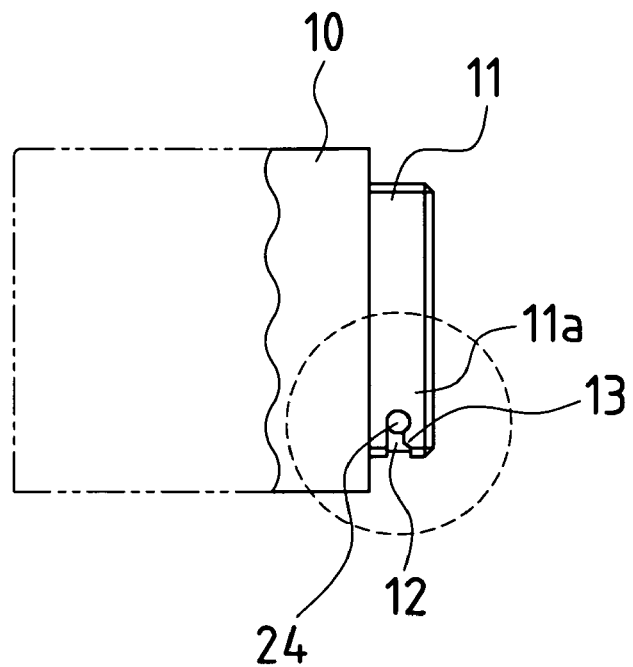
FIG. 5A is a plan view of the optical transmission device of the first embodiment.

The rotating shafts 24 of the shutter 20 are attached to one side of the housing 10, as shown in FIGS. 5A and B. Specifically, the installation part 11 that forms the insertion hole 15 protrudes from one end of the housing 10, and when viewing the housing 10 from the front, is formed in the shape of a sideways U with the left side open. Groove-shaped bearing portions 12, in which the rotating shafts 24 of the shutter 20 are fitted from the left side, are respectively formed in an upper edge 11a and a lower edge 11b of the installation part 11.

A retaining protrusion 13 is provided as a detachment prevention means in the groove of each bearing portion 12, in order to prevent detachment of the rotating shaft 24 of shutter 20 from the bearing portion 12. As shown in FIG. 2, a positioning protrusion 14 for preventing shutter pop-out is provided in the vicinity of the base of the rotating shafts of the shutter 20 of the housing 10, such that positioning of the free end of the shutter 20 can be performed when the shutter 20 is in the blocking position. Because this positioning protrusion 14 contacts the rear face of the shutter 20, the free end of the shutter 20 does not pop out from the housing 10 when the shutter 20 is in the blocking position.

As shown in FIG. 1 and FIG. 3, a guiding depression 17, comprising a V-shaped groove portion, is formed in the sliding direction of the movable arm 32 such that movable arm 32 of the torsion coil spring 30 engages and slides along the interior face of the housing 10. The portion of the end of the movable arm 32 of the torsion coil spring 30 that slides along the housing 10 is bent such that it will not become a needle-like end face, and the shutter 20 opens and closes smoothly.

In the state of being a holder, the movable arm 32 of the torsion coil spring 30 engages with the guiding depression 17 of housing 10, and because the holding arm 33 engages with the fixing depression 26 in the rear face of the main shutter body 21, the shutter 20 is positioned in the heightwise direction. Accordingly, it is possible to prevent the shutter 20, which operates to open and close, from touching the upper end 11a and the lower end 11b of the installation part 11 of the housing 10.

Next, assembly of the optical transmission device with the above configuration is explained. First, the torsion coil spring 30 is mounted to the support shaft 23 of the shutter 20, forming a shutter mechanism 19 (see FIGS. 4B and C). When installing the torsion coil spring 30, by fitting the torsion coil spring 30 to the support shaft 23 while bending the coil portion of the torsion coil spring 30, the protrusion 25 for preventing spring detachment will not become an obstacle.

The shutter mechanism 19 assembled in this manner is fitted to the bearing portion 12 provided in the housing 10. The torsion coil spring 30 is seated in the housing 10 in advance, and the movable arm 32 is engaged with the guiding depression 17 of the housing 10. Because the movable arm 32 is longer than the holding arm 22, it is easy to engage the movable arm 32 with the guiding protrusion 17.

Figure 5B:
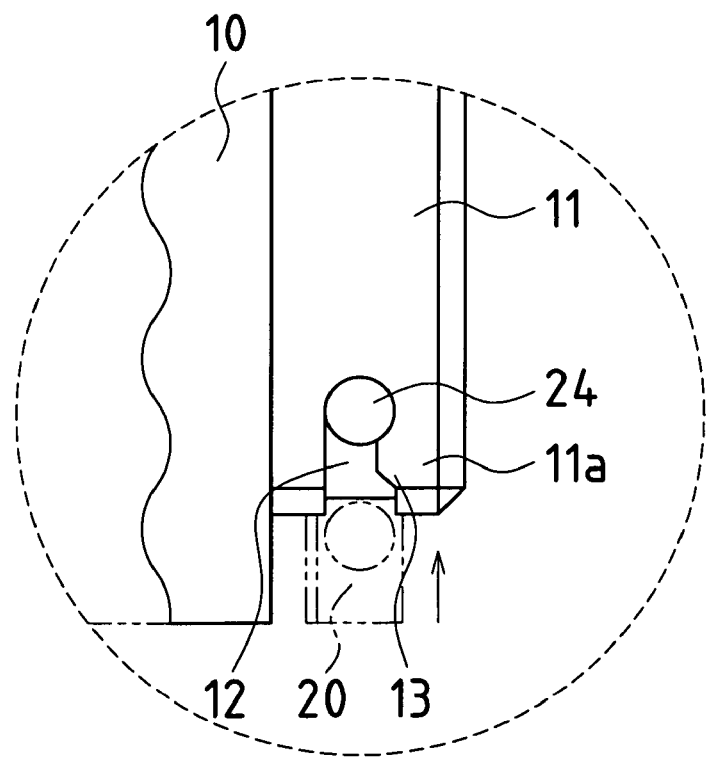
FIG. 5B is an enlarged plan view thereof.

Further, by moving the shutter mechanism 19 from the outside of the housing 10 towards the inside, each of the rotating shafts 24 is pushed into one of the bearing portions 12. The rotating shafts 24 of the shutter 20 pass beyond the retaining protrusion 13, and are fitted to the base portion of the bearing portions 12 (see FIG. 5).

Next, usage of the optical transmission device 1 will be described.

When the shutter 20 is in a blocking position, the moving arm 32 of the torsion coil spring 30 presses against the inside surface (the guiding depression 17) of the housing 10, and the holding arm 33 biases the shutter 20 in the direction blocking the same (see FIG. 3A). As the plug is inserted into the holder through the insertion hole 15, the shutter 20 rotates within the housing 10 around the rotating shafts 24, and is received inside the holder (see FIG. 3B). Along with this rotation of the shutter 20, the movable arm 32 of the torsion coil spring 30 slides along the guiding depression 17 of the housing 10, and with the plug fully inserted, is contained inside the housing 10 in a bent state. When the plug is removed, the shutter 20 returns to its original closed state due to the restoration force of the torsion coil spring 30.

When the shutter is opened or closed, there is torsional movement of the movable arm 32 of the torsion coil spring 30 in the horizontal direction without moving in the vertical direction, emission of force can be prevented, and the shutter can be reliably and smoothly opened and closed. Moreover, due to the arms 32 and 33 of the torsion coil spring 30 engaging with the housing 10 and the shutter 20, because the shutter 20 is positioned in the heightwise direction relative to the housing 10, the shutter 20 can be opened and closed without contacting the bottom face of the shutter opening and closing portion of the housing 10 due to its own weight, so that it is possible to produce a highly reliable part. It does not matter which of the two arms of the torsion coil spring 30 is at the top and which is at the bottom.

Figure 6:
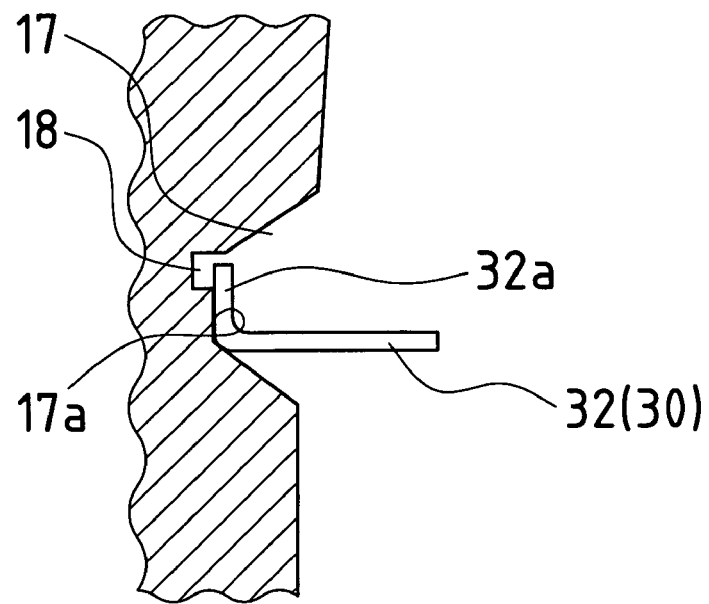
FIG. 6 is a cross-sectional view of the relevant parts showing the movable arm of the torsion coil spring in a state contacting the guiding depression of the housing.

In the present embodiment, the guiding depression 17 that guides movable arm 32 of the torsion coil spring 30 is a V-shaped groove, but any shape may be used as long as it is a structure by which the movable arm does not move vertically due to opening and closing the shutter. For example, as shown in FIG. 6, a shape may be used in which the movable arm 32 of the torsion coil spring 30 is bent upward to about 90 degrees, and that bent portion 32a is slid along a bottom surface 17a (the spring sliding surface) formed on the flat surface of the guiding depression 17. In this case, it is preferable to form a relief cavity 18 along the guiding depression 17, in the portion of the bottom face 17a of the guiding depression 17 where the tip of bent portion 32a is positioned.

In this way, a structure is made wherein the movable arm 32 of the torsion coil spring 30 does not move in the vertical direction, and further, by forming the relief cavity 18 in the housing 10 such that the tip of the movable arm 30 does not make contact, even if the tip of the movable arm 32 of the torsion coil spring 30 is parallel with the spring sliding surface 17a of the housing 10, it can slide without the tip of the arm contacting the housing 10.

Figure 7:
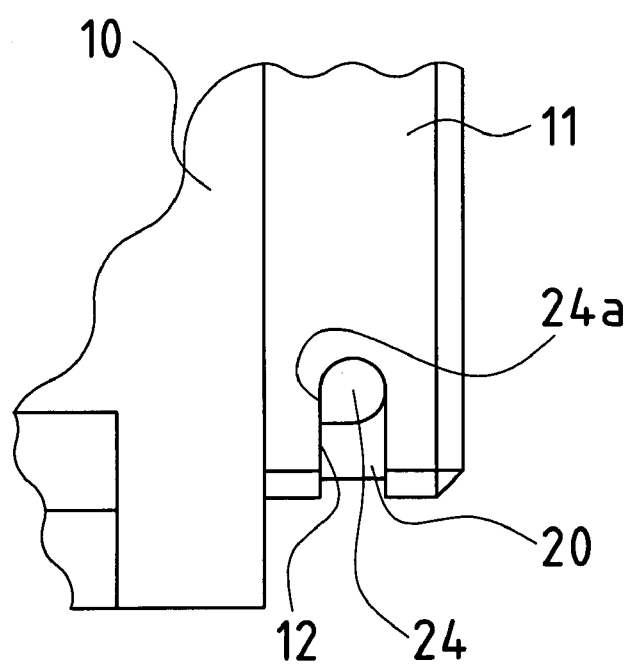
FIG. 7 is an enlarged plan view showing a modified example of the first embodiment shown in FIG. 5B.

The positioning protrusion 14 is provided in one piece with the housing 10 as a structure preventing shutter-pop out, but the present invention is not limited to this. A protrusion may be provided on the rear side of the shutter 20 touching the positioning protrusion 14, such that it touches the housing 10 when the shutter is closed, and the shutter 20 does not pop out from the housing 10. As shown in FIG. 7, it is also possible that part of the cross-section of the rotating shafts 24 of the shutter 20 is formed in an angular shape (non-circular), and when the shutter 20 attempts to open in the outer direction of the housing 10, a level surface 24a of the rotating shafts 24 of the shutter 20 is in surface contact with the bearing portion 12 of the housing 10, and it is therefore possible to make a structure that prevents pop-out of the shutter 20.

Figure 8B:
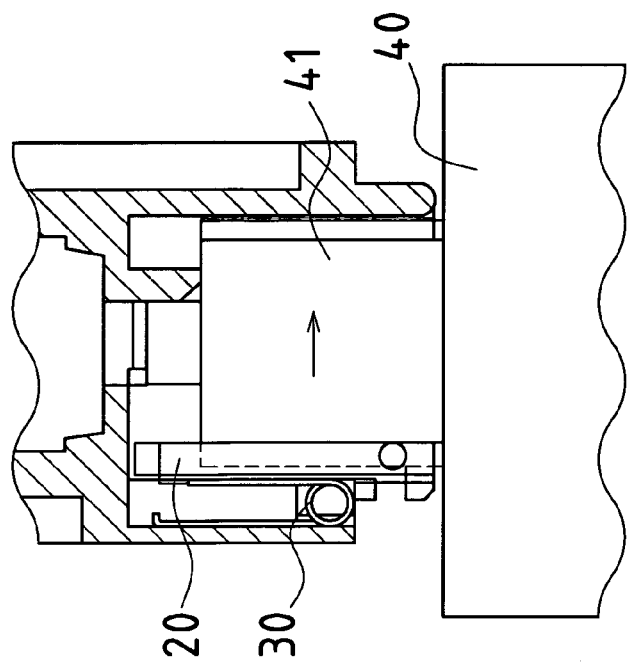
FIG. 8B is a cross-sectional plan view of this modified example after plug insertion.
Figure 8A:
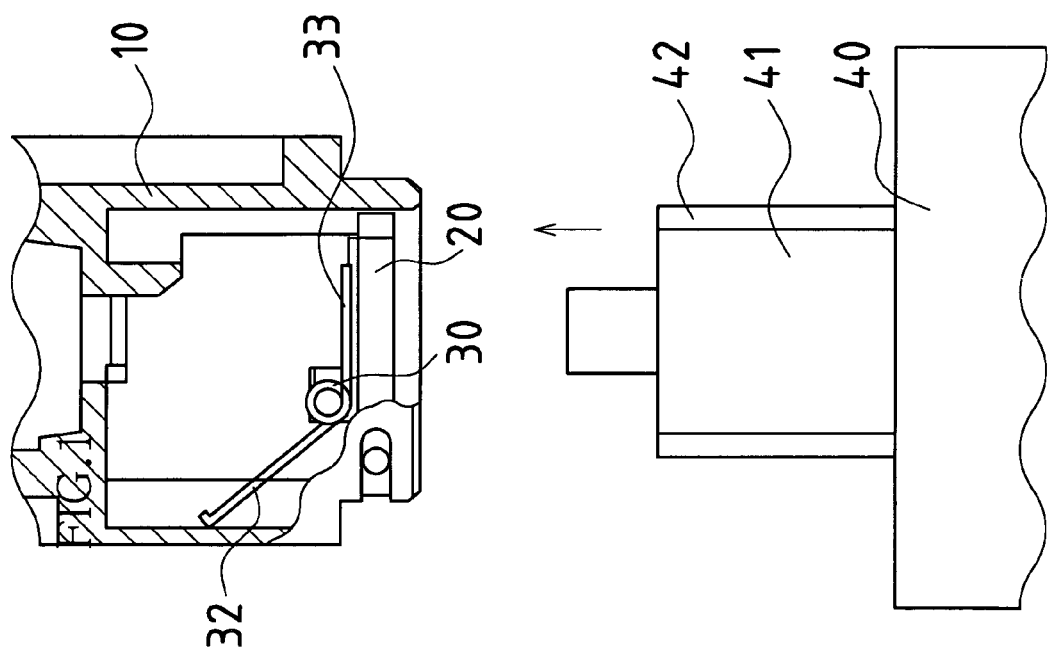
FIG. 8A is a cross-sectional plan view of the modified example of the optical transmission device of a first embodiment before plug insertion.

FIGS. 8A and 8B show a modified example in which, in the optical transmission device 1 of the first embodiment, the shaft diameter of the coil portion 32 of the torsion coil spring 30 is enlarged, and the bearing portions 12 provided in the housing 10 are deepened toward the center of the holder. Because a plug 40 is configured with a plug projection 42 provided in a plug insertion portion 41, the plug insertion portion 41 has no play in the vertical direction when a plug is inserted, but within a range of tolerance, there is play in the lateral direction of the plug 40.

Accordingly, the shaft diameter of the coil portion 31 of the torsion coil spring 30 is set at a size such that the housing 10, the shutter 20, and the plug insertion portion 41 interact when the plug is inserted. As a result, as shown in FIG. 8B, using the springiness of the coil portion 31 of the torsion coil spring 30, by pressing the shutter 20 against the plug insertion portion 41 (in the direction of the arrow) with the repulsive force of the torsion coil spring 30, it is possible to prevent play of the plug 40.

SECOND EMBODIMENT

Figure 9A:
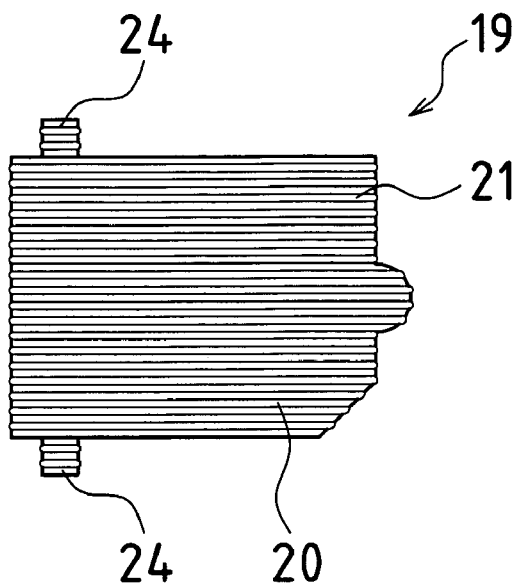
FIG. 9A is a diagram illustrating the shutter mechanism of a second embodiment of the present invention.

FIG. 9 shows the shutter mechanism 19 of a second embodiment of the present invention. FIG. 9A shows a shutter mechanism configured from a torsion coil spring with the shutter 20 and an elastic body configured as single body. The rotating shafts 24 have a function corresponding to the coil portion 31 of the torsion coil spring 30. The ends of the torsion coil spring that forms the rotating shafts 24 are fixed to the housing 10. By also forming the main shutter body 21 from the same member as the coil spring, because that member fulfills the role of the shutter, the shutter necessary up to now is not required.

Figure 9B:
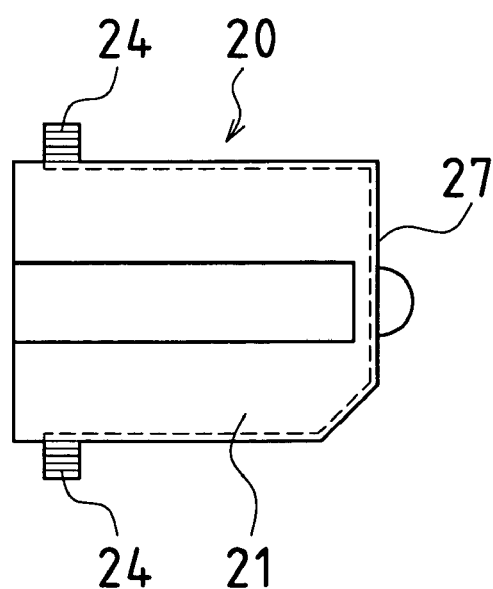
FIG. 9B is a front view thereof.
Figure 9C:
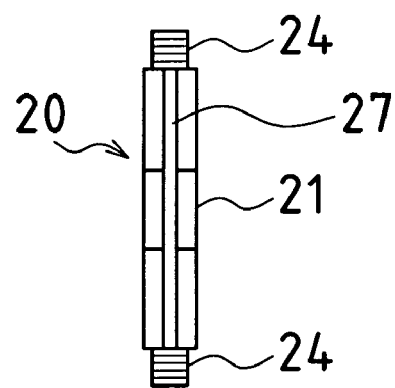
FIG. 9C is a side view thereof.

As shown in FIGS. 9B and 9C, it is also possible to adapt a configuration in which the rotating shafts 24 of shutter 20, and a shutter frame 27, are configured from the torsion coil spring, and a resin plate corresponding to the main shutter body 21 is fitted to that frame 27.

THIRD EMBODIMENT

Figure 10A:
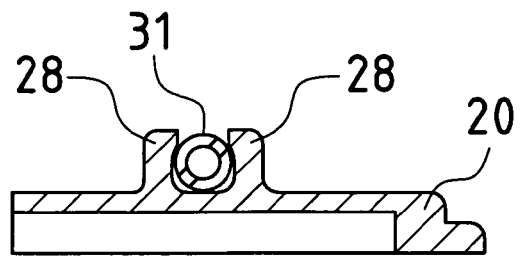
FIG. 10A is a cross-sectional plan view of the shutter mechanism of a third embodiment of the present invention.
Figure 10B:
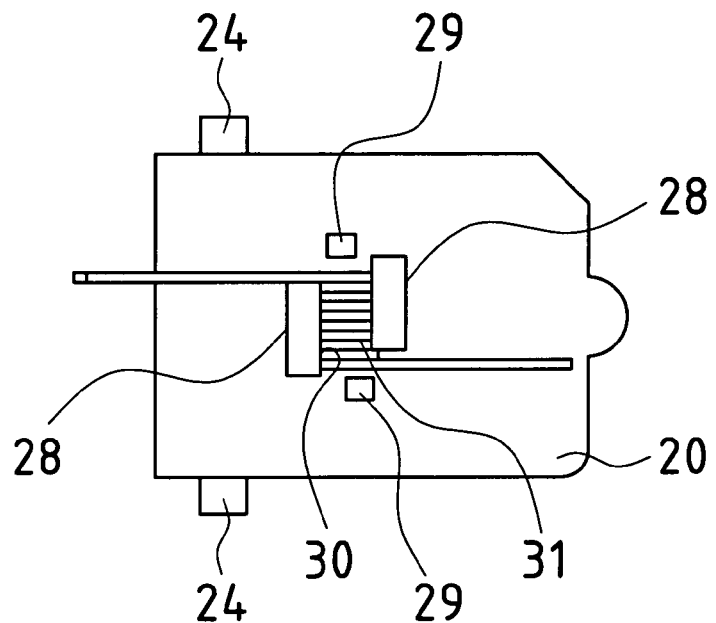
FIG. 10B is a rear view thereof.
Figure 10C:
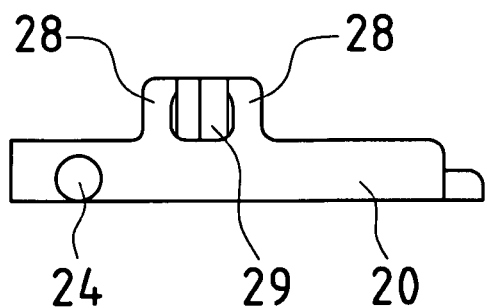
FIG. 10C is a bottom view thereof.

A third embodiment of the present invention, shown in FIGS. 10A through C, is provided with a pair of hooks (holding protrusions) 28 on the rear side of shutter 21 that fit around and hold the coil portion 31 of the torsion coil spring 30. This third embodiment is easy to assemble, because the aforementioned support portion is not necessary. Also, the third embodiment of the present invention is configured with stoppers (protrusions for preventing positional displacement) 29 provided on the sides where there are no hooks 28, such that positional displacement of the torsion coil spring 30 does not occur.

Figure 11A:
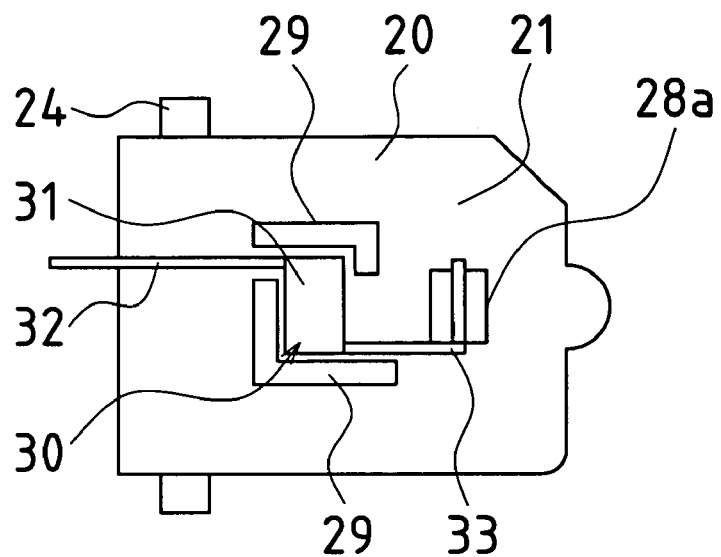
FIG. 11A is a rear view of another example of the shutter mechanism of the third embodiment of the present invention.
Figure 11B:
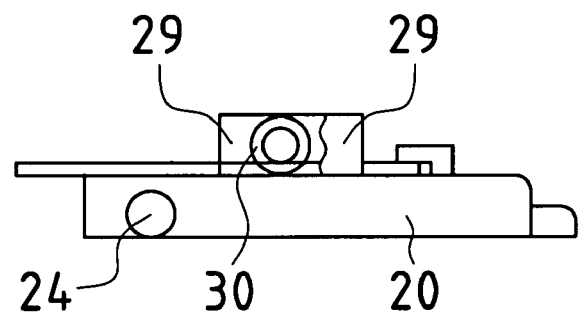
FIG. 11B is a partially cut-away plan view.
Figure 11C:
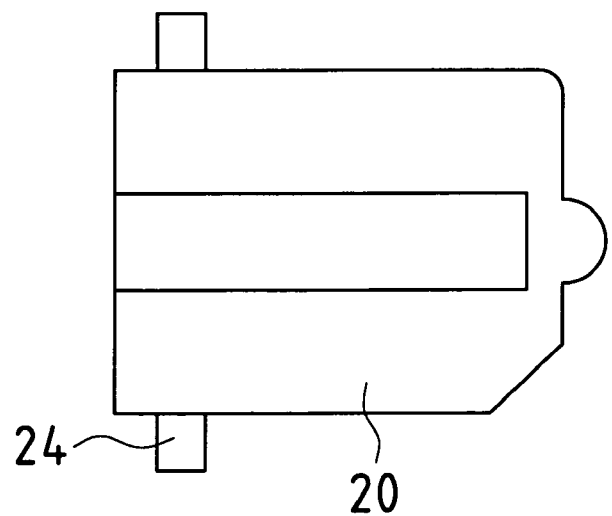
FIG. 11C is a front view thereof.

FIGS. 11A through C show a modified example of the third embodiment. This modified example is structured with the holding arm 33 of the torsion coil spring 30 fitted and fixed to a holding portion 28a that protrudes from the rear side of the main shutter body 21, and is easy to assemble because the support portion is not necessary. Also, in this modified example, the protrusions 29 are provided around the coil portion 31 such that positional displacement of the torsion coil spring 30 does not occur.

FOURTH EMBODIMENT

Figure 12A:
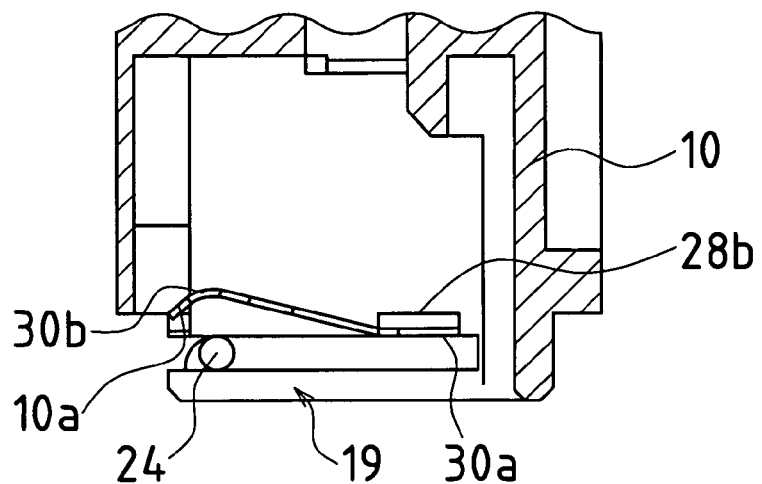
FIGS. 12A through C are diagrams illustrating a fourth embodiment of the present invention; they are cross-sectional views of the optical transmission device with a structure wherein a plate spring is held in the shutter.
Figure 12B:
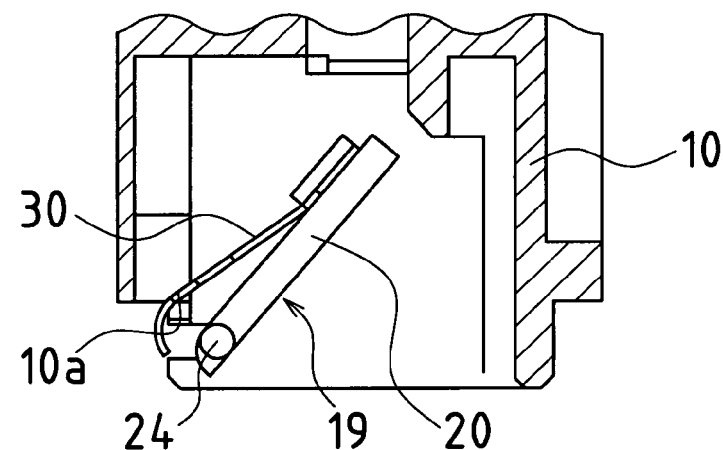
Figure 12C:
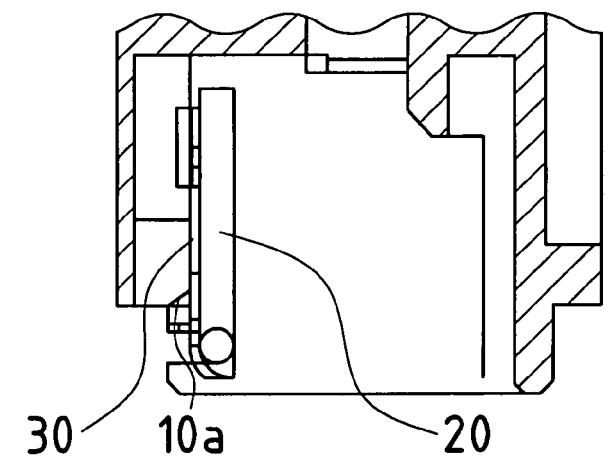
Figure 13A:
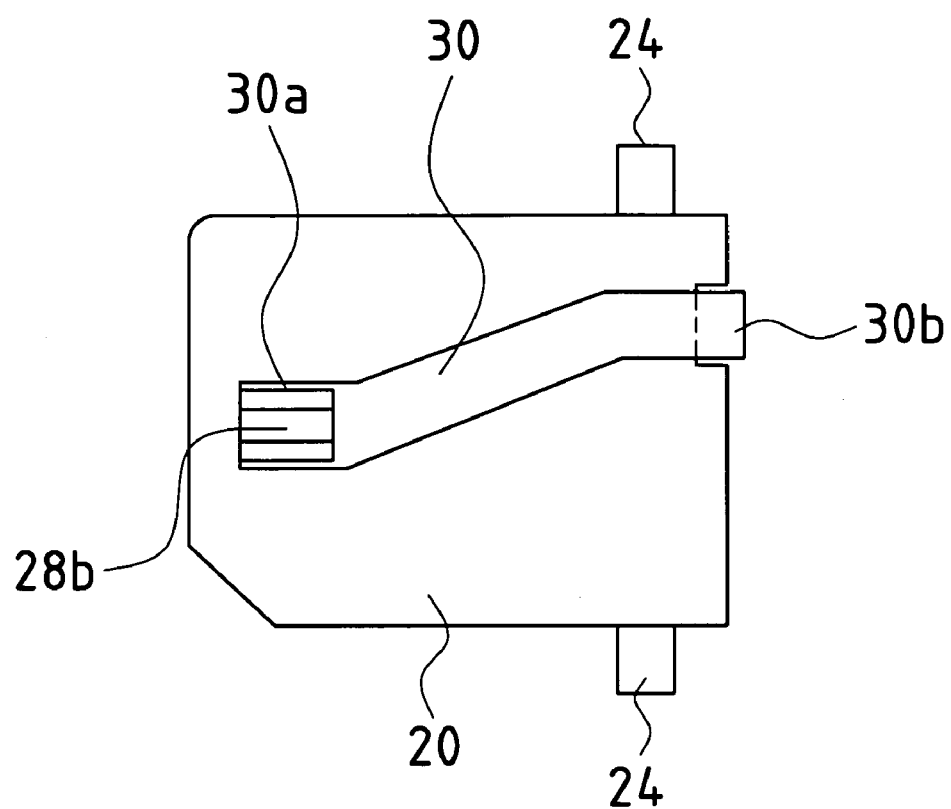
FIG. 13A is a rear view of the shutter mechanism of a fourth embodiment of the present invention.
Figure 13B:
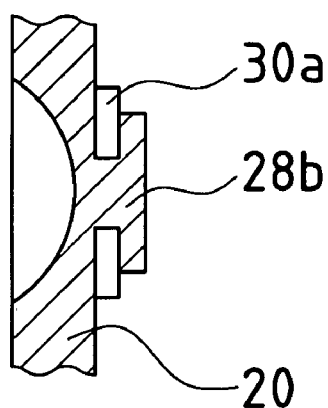
FIG. 13B is a cross-sectional view of the relevant parts thereof.

FIG. 12 and FIG. 13 show a fourth embodiment of the present invention. In this embodiment, an elastic body is formed by a plate spring 30, which is incorporated into the housing 10. An end 30a of the plate spring 30 is fixed to and held by a fitting portion 28b provided at the free end of the shutter 20 relative to the rotating shaft 24. The other end of the plate spring 30 is made the free end, and is provided extending further than the rotating shaft 24 to the other end of the shutter 20. Because the free end of the plate spring 30 presses against an inclined face 10a formed at the edge of the side wall of the housing 10, the shutter 20 maintains a closed condition when a plug is not inserted due to the elastic force of the plate spring 30 (see FIG. 12A). When a plug is inserted, the shutter 20 and the plate spring 30 are contained within the housing 10 while the plate spring 30 resists elastic deformation and flexes (see FIGS. 12B and 12C).

The plate spring 30 of the present embodiment has one end fixed, and uses a plate spring with a length that the other end projects further outward than the shutter rotating shafts. The structure by which the plate spring 30 is installed to the shutter 20 may be assembled using several individual parts, but it is also possible to perform insert molding when molding the shutter 30. By insert molding, it becomes possible to decrease the number of assembly steps. It is also possible when molding the housing to insert mold the plate spring in the housing. By insert molding in a small shutter, it is possible to increase the quantity molded at one time, and thus it becomes possible to carry out more effective production.

The present invention may be embodied in various other forms without departing from the spirit of essential characteristics thereof. The embodiments disclosed in this application are to be considered in all respects as illustrative and not limiting. The scope of the present invention is indicated by the scope of the appended claims rather than by the foregoing description, and all changes that come within the meaning and range of equivalency of the claims are intended to be embraced therein.

What is claimed is:

1. An optical transmission device, comprising:
   a case that holds an optical element that receives and/or transmits light, provided with a plug insertion hole into which an optical signal transmission plug is inserted; and
   a shutter mechanism having a shutter that opens and closes the plug insertion hole;
   wherein the case is provided with an installation part that holds the shutter such that it can rotate freely, and the shutter mechanism can be installed from an outside to the installation part,
   wherein the shutter mechanism is provided with a torsion coil spring, the torsion coil spring being held by the shutter and biasing the shutter in a direction that closes the shutter,
   wherein the shutter is provided with a rotating shaft and a holding means for holding the torsion coil spring, the holding means being configured of a support portion for holding the torsion coil spring and a protrusion for preventing detachment of the torsion coil spring, and
   wherein the installation part is provided with a bearing into which the rotating shaft is fitted.

2. The optical transmission device according to claim 1, wherein a part of the torsion coil spring has a movable arm, and end of which being adapted to slide along an inside surface of the case when the shutter opens or closes.

3. The optical transmission device according to claim 2, wherein a guiding depression is provided for fixing the position of the arm of the torsion coil spring on the inside surface of the case on which the arm of the torsion coil spring slides.

4. The optical transmission device according to claim 3, wherein a fixing depression is provided on the rear surface of the shutter, the fixing depression fixes the position of the shutter in the vertical direction by engagement of an arm of the torsion coil spring.

5. The optical transmission device according to claim 1, wherein a guiding depression is provided for fixing the position of the arm of the torsion coil spring on an inside surface of the case on which the arm of the torsion coil spring slides.

6. The optical transmission device according to claim 5, wherein a fixing depression is provided on the rear surface of the shutter, the fixing depression fixes the shutter in the vertical direction by engagement of an arm of the torsion coil spring.

7. The optical transmission device according to claim 1, wherein when the shutter is opened and a plug is inserted, the shutter presses the plug against an inside surface of the case due to the elastic force of the torsion coil spring.

8. The optical transmission device according to claim 1, wherein the rotating shaft of the shutter is made of a coil portion of a torsion coil spring, and the shutter comprises a resin plate and a metal wire made into one piece with the torsion coil spring.

9. The optical transmission device according to claim 1, wherein on a rear side of the shutter, holding protrusions that are fitted around the coil portion of the torsion coil spring are formed by molding the holding protrusions and the coil portion in one piece with the rear side of the shutter.

10. The optical transmission device according to claim 9, wherein protrusions for preventing positional displacement of the torsion coil spring are provided around the torsion coil spring.

11. An electronic apparatus provided with the optical transmission device according to claim 1.

12. An optical transmission device, comprising:
    a case that holds an optical element that receives and/or transmits light, provided with a plug insertion hole into which an optical signal transmission plug is inserted; and
    a shutter mechanism having a shutter that opens and closes the plug insertion hole;
    wherein the case is provided with an installation part that holds the shutter such that it can rotate freely and a positioning means for preventing the shutter from popping out, and the shutter mechanism can be installed from an outside to the installation part,
    wherein the shutter mechanism is provided with a separate elastic body that biases the shutter in a direction that closes the shutter,
    wherein the shutter is provided with a rotating shaft and a holding means for holding the elastic body, and
    wherein the installation part is provided with a bearing into which the rotating shaft is fitted.

13. The optical transmission device according to claim 12, wherein the bearing portion of the case is provided with a detachment preventing means for preventing detachment of the rotating shaft of the shutter.

14. The optical transmission device according to claim 13, wherein when the shutter is opened and a plug is inserted, the shutter presses the plug against an inside surface of the case due to the elastic force of the elastic body.

15. The optical transmission device according to claim 12, wherein when the shutter is opened and a plug is inserted, the shutter presses the plug against an inside surface of the case due to the elastic force of the elastic body.

16. An optical transmission device, comprising:
    a case that holds an optical element that receives and/or transmits light, provided with a plug insertion hole into which an optical signal transmission plug is inserted; and
    a shutter mechanism having a shutter that opens and closes the plug insertion hole;
    wherein the case is provided with an installation part that holds the shutter such that it can rotate freely, and the shutter mechanism can be installed from an outside to the installation part,
    wherein the shutter mechanism is provided with a separate elastic body that biases the shutter in a direction that closes the shutter,
    wherein the shutter is provided with a rotating shaft and a holding means for holding the elastic body, and
    wherein the installation part is provided with a bearing into which the rotating shaft is fitted, and the bearing is provided with a detachment preventing means for preventing detachment of the rotating shaft of the shutter.

17. The optical transmission device according to claim 16, wherein when the shutter is opened and a plug is inserted, the shutter presses the plug against an inside surface of the case due to the elastic force of the elastic body.

18. An optical transmission device, comprising:
a case that holds an optical element that receives and/or transmits light, provided with a plug insertion hole into which an optical signal transmission plug is inserted; and
a shutter mechanism having a shutter that opens and closes the plug insertion hole;
wherein the case is provided with an installation part that holds the shutter such that it can rotate freely, and the shutter mechanism can be installed from an outside to the installation part, wherein the shutter mechanism is provided with a plate spring that biases the shutter in a direction that closes the shutter, and the shutter and the plate spring are molded in one piece,
wherein the shutter is provided with a rotating shaft and a holding means for holding the plate spring, and
wherein the installation part is provided with a bearing into which the rotating shaft is fitted.

* * * * *